H. H. MORETON.
MANIFOLD FOR INTERNAL COMBUSTION ENGINES.
APPLICATION FILED DEC. 11, 1917.
1,314,091. Patented Aug. 26, 1919.
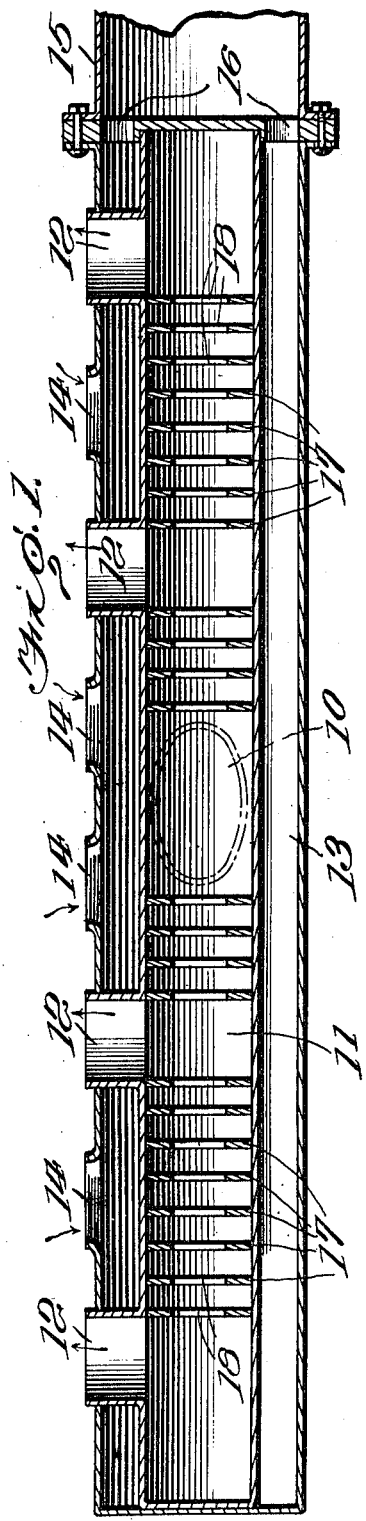
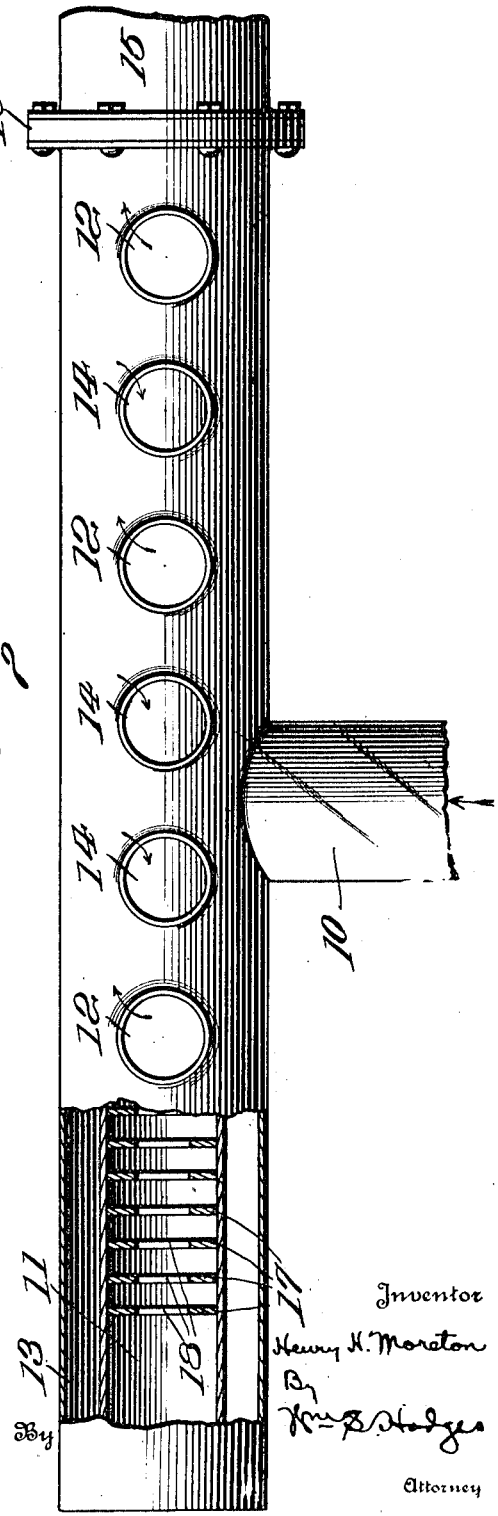

UNITED STATES PATENT OFFICE.

HENRY H. MORETON, OF STONY POINT, NEW YORK, ASSIGNOR TO MORETON ACCESSORIES COMPANY, A CORPORATION OF DELAWARE.

MANIFOLD FOR INTERNAL-COMBUSTION ENGINES.

1,314,091.   Specification of Letters Patent.   Patented Aug. 26, 1919.

Application filed December 11, 1917. Serial No. 206,611.

*To all whom it may concern:*

Be it known that I, HENRY H. MORETON, a citizen of the United States, residing at Stony Point, in the county of Rockland and State of New York, have invented new and useful Improvements in Manifolds for Internal-Combustion Engines, of which the following is a specification.

This invention is a device for improving the explosive qualities of hydrocarbon mixtures of the type usually fed to internal combustion engines.

One of the objects of the invention is to provide simple and efficient means, whereby the explosive mixture is heated and its travel to the engine so regulated as to secure a maximum degree of vaporization. A further object is to provide means whereby a maximum of heating surface is produced and throttling action on the motor is avoided.

The invention will be hereinafter fully set forth and particularly pointed out in the claims.

In the accompanying drawing:—

Figure 1 is a horizontal sectional view illustrating the manifold of an internal combustion engine, constructed in accordance with the invention. Fig. 2 is a front elevation thereof.

Referring to the drawing, 10 designates the mixture intake pipe, which communicates with a central conduit 11, having lateral discharge ports 12, communicating with the intake chambers of an internal combustion engine, four of such ports being illustrated. Surrounding the conduit 11, and concentric therewith is an exhaust manifold or conduit 13, communicating with the exhausts of the several cylinders by means of ports 14, said exhaust manifold discharging into a suitable exhaust pipe 15 through ports 16 located at one end of the manifold, the other end being closed. Except for the ports 12, the conduit 11 is closed. Located within the conduit 11 is a plurality of series of circular plates or partitions 17, attached to the walls of the conduit at their edges, and provided with central openings 18. The openings of all of the partitions are in substantial alinement with the longitudinal axis of the conduit 11, and form what may be termed "vacuum pockets."

In operation, when the engine is running, the suction created by the action of the engine will maintain a partial vacuum within the conduit 11 at all times. During the suction stroke of each piston, the vacuum chamber nearest to that cylinder, and formed by the partitions 17, is first exhausted, and the action of the suction is to cause a progressive series of partial exhaustions in the remaining chambers between the engine intake 12 and the pipe 10. This being so, the explosive mixture drawn into the conduit 11 through the conduit 10, is compelled to enter in part, at least, all of the chambers between the supply pipe 10 and the intake 12, thus insuring intimate contact with the heated disks 17 and the walls of the conduit 11, thereby producing expansion at the upper end. The conduit 11 and the disks 17 are heated to a high temperature by the exhaust gases from the engine, and the radial reciprocation of the explosive mixture in its travel to the engine, causes it to come into contact with a maximum of heated surface, thereby insuring practically complete vaporization. The openings 18 must be of a size to permit of the flow of the explosive mixture without a throttling effect upon the engine.

Having thus explained the nature of the invention and described an operative manner of constructing and using the same, although without attempting to set forth all of the forms in which it may be made, or all of the forms of its use, what is claimed is:—

1. An improved manifold for internal combustion engines comprising an intake conduit having a plurality of spaced apart partitions therein forming vacuum pockets, and means for heating said conduit.

2. An improved manifold for explosive engines comprising an intake conduit having a plurality of spaced apart partitions therein forming vacuum pockets, and means for causing exhaust gases to heat said conduit.

3. A manifold for internal combustion engines comprising an intake conduit provided with a plurality of spaced apart partitions therein forming pockets therebetween, and means for heating said conduit.

4. An improved manifold for internal combustion engines comprising an intake conduit, a plurality of spaced apart annular partitions arranged diametrically across said conduit and having openings in line with the longitudinal axis of the conduit, and means for heating the conduit.

5. An improved manifold for internal combustion engines comprising an intake conduit having a supply pipe and discharge openings, spaced apart partitions within said conduit forming a plurality of vacuum pockets within said conduit, and an exhaust manifold inclosing said conduit.

6. An improved manifold for internal combustion engines comprising an intake conduit provided with discharge openings, spaced apart annular partitions secured within said conduit and provided with openings in line with the longitudinal axis of the conduit, and an exhaust manifold surrounding said intake conduit.

In testimony whereof I have hereunto set my hand.

HENRY H. MORETON.